United States Patent [19]
Lefèvre et al.

[11] Patent Number: 5,141,316
[45] Date of Patent: Aug. 25, 1992

[54] OPTICAL-FIBER MEASURING DEVICE, GYROMETER, CENTRAL NAVIGATION AND STABILIZING SYSTEM

[75] Inventors: Hervé Lefèvre, Paris; Philippe Martin, Fresnes, both of France

[73] Assignee: Photonetics S.A., France

[21] Appl. No.: 614,113

[22] Filed: Nov. 16, 1990

[30] Foreign Application Priority Data

Nov. 17, 1989 [FR] France .................. 89 15117

[51] Int. Cl.⁵ .................................................. G01C 19/72
[52] U.S. Cl. ........................................................ 356/350
[58] Field of Search ............................... 356/350, 345

[56] References Cited

U.S. PATENT DOCUMENTS

| | | | |
|---|---|---|---|
| 4,687,330 | 8/1987 | Lefèvre | 356/350 |
| 4,705,399 | 11/1987 | Graindorge et al. | 356/350 |
| 5,018,858 | 5/1991 | Malvern | 356/350 |
| 5,039,220 | 8/1991 | Arditty et al. | 356/345 |

FOREIGN PATENT DOCUMENTS

0168292 1/1986 France.
0359866 3/1990 France.

Primary Examiner—Samuel A. Turner
Assistant Examiner—LaCharles P. Keesee
Attorney, Agent, or Firm—Mason, Fenwick & Lawrence

[57] ABSTRACT

The invention relates to a fibre optic measuring device of the type in which the change in a measured parameter generates a phase difference between two waves in a SAGNAC ring interferometer (2). Electronic means (7) comprise a processing system (9) delivering a signal depending on the measured parameter and electronic means (12) controlling the phase modulator (4). The electronic means (12) produce a control signal for the modulator determined in such a way that the phase difference $\delta\Phi_m$ which it produces between the counter-propagating waves periodically takes the following four successive values:

$$\delta\Phi_1 = \Phi_o \quad \delta\Phi_3 = a\Phi_o$$
$$\delta\Phi_2 = -\Phi_o \quad \delta\Phi_4 = -a\Phi_o$$

where $\Phi_o$ is a constant phase shift and it depends on a, and a is a positive constant satisfying the condition: $\cos \Phi_o = \cos a\Phi_o$. The gain of the channel for controlling the modulation is kept constant by producing a signal depending on the said gain by exploiting the four values x1, x2, x3, x4 delivered in response to a period of the modulation signal according to the expression $(x1+x3)-(x2+x4)$, the said signal acting on the modulator in such a way as to keep the gain constant.

12 Claims, 5 Drawing Sheets

OPTICAL-FIBER MEASURING DEVICE, GYROMETER, CENTRAL NAVIGATION AND STABILIZING SYSTEM

The invention relates to a fibre optic measuring device enabling measurement of the change in a parameter which produces non-reciprocal perturbations in a SAGNAC ring interferometer.

The SAGNAC interferometer and the physical phenomena which it employs are well known. In such an interferometer a beam splitter or other splitting device divides an incident wave. The two counter-propagating waves thus created propagate in opposite senses along a closed optical path, recombine and produce interference which depends on the phase shift in the waves at the time of their recombination.

Originally, the closed optical path of SAGNAC interferometers was defined by mirrors. It is now known that it may be made up by a multi-turn monomode fibre optic coil.

It is also known that certain physical phenomena are able to produce perturbations, particularly non-reciprocal phase shifts, in counter-propagating waves generating a relative phase shift in these waves which modifies their state of interference at the time of their recombination.

Measurement of this relative phase shift enables the phenomenon which generated it to be quantified.

The principle physical phenomenon able to create these non-reciprocal perturbations is the SAGNAC effect produced by the rotation of the interferometer relative to an axis perpendicular to the plane of its closed optical path. The FARADAY effect or co-linear magneto-optic effect is also known to produce non-reciprocal effects of this type; this has for example been described in an article in the journal OPTIC LETTERS (Vol. 7, no. 4, April 1982, pages 180-182) by K. BOHM. Under certain conditions, other effects may also produce a non-reciprocal phase shift.

By contrast, changes in numerous parameters which are representative of the environment and which are often the origin of perturbations in the measurements have only reciprocal effects on the SAGNAC interferometer, do not perturb the relative phase shift between the counter-propagating waves and do not therefore influence the measurement of the parameter studied. Such is the case with slow changes in temperature, indices, etc. which modify the optical path traversed by the waves, but modify it in a reciprocal manner.

Much work has been conducted in order to improve the sensitivity and precision of measurements that can be carried out with such a measuring instrument. For example, Chapter 9 entitled "Fiber Optic Gyroscope" by Hervé C. Lefèvre in the work "Optical Fibre Sensors", Vol. 2 -Artech House- 1989, can be consulted on this subject.

In particular, it was firstly observed that the response delivered by the SAGNAC interferometer is of the form $P=P_0(1+\cos \delta\Phi)$ and that therefore the sensitivity of this signal in this neighbourhood of the $\delta\Phi=0$ phase difference is low. It has been proposed to introduce a square phase difference modulation of amplitute more or less $\pi/2$ for example which displaces the operating point and produces a periodic signal the amplitude of which is a sinusoidal function of the measured parameter and which can therefore be exploited with greater sensitivity and stability.

It was then shown that the precision of the measurement is improved through the use of a zero method, also referred to as closed loop functioning. According to this method, an additional so-called negative feedback phase difference $\delta\Phi_{cr}$ is applied and serves to compensate the phase shift $\delta\Phi_p$ produced by the measured parameter. The sum of these two phase differences $\delta\Phi_{cr}$ and $\delta\Phi_p$ is kept at zero, which enables the interferometer to be operated with the maximum of precision. The measurement is carried out by exploiting the signal necessary in the production of the negative feedback phase difference $\delta\Phi_{cr}$. Thus, the measurement is stable and linear.

The servocontrol necessary for this closed loop functioning may be carried out through a frequency shift. This shift may be generated directly from acousto-optic modulators or else simulated by applying a serrodyne modulation to a phase modulator. Such a serrodyne modulation is performed by applying a saw-tooth phase modulation ramp. It is well known, however, that this requires a well-controlled fall back of 2 m$\pi$ (where m is an integer) to avoid spurious side-bands. However, the exploitation of the signal after the fall backs enables this controlling of the value of the fall back in order to ensure good precision in the measurement. It is also known that a continuous ramp may be replaced by steps synchronised to a clock and that such a signal may be generated from a logic circuit and from a digital-analog converter.

So as to improve the sensitivity and the precision of the measurement, it has moreover been proposed to digitise the signal after exiting the detector. The electronic processing means then comprise an analog-digital converter, a digital processing system exploiting the signal delivered by the analog-digital converter reducing its component to the modulation frequency around the continuum. A digital servocontrol loop filter fed by the signal leaving the digital processing system delivers a signal representing the measured parameter. A register receiving the signal leaving the digital servocontrol loop filter delivers a signal depending on the measured parameter for any desired external use. An accumulator fed by the signal leaving the register generates a digital ramp the slope of which depends on the measured parameter and a digital-analog converter fed by the ramp signal issuing from the accumulator controls the phase modulator.

The aim of the present invention is to improve the sensitivity and the stability of a fibre optic measuring device in which the change in a measured parameter generates a phase difference between two waves. In particular, it has the objective of proposing such a device in which the gain in the channel for negative feedback control of the modulation is controlled and kept constant at all times even when, for a long period, the measured parameter undergoes no change. In fact, according to the prior art, signals produced at the time of the two-pi fall back in the phase ramp are used to keep this gain constant. Now, such signals are not available for small changes in the measured parameter and their frequency depends on the value of the measured parameter.

The invention relates to a fibre optic measuring device in which the change in the measured parameter generates a phase difference between two waves, comprising a quasi-monochromatic light source, a SAGNAC ring interferometer, preferably monomode, in which two counter-propagating waves propagate, the time for propagation of the waves between their separation and their recombination being $\tau$, a detector, a phase modulator, and electronic means comprising a processing system delivering a signal depending on the measured parameter and electronic means controlling the phase modulator.

According to the invention, the modulation signal $\Phi_m$ is determined in such a way that the modulation of the phase difference $\delta\Phi_m$ which it produces between the counter-propagating waves periodically takes the following four successive values:

$$\delta\Phi_1 = \Phi_o \quad \delta\Phi_2 = a\Phi_o$$
$$\delta\Phi_3 = -\Phi_o \quad \delta\Phi_4 = -a\Phi_o$$

where $\Phi_o$ is a constant phase shift and it depends on a, and a is a positive constant satisfying the condition: $\cos\Phi_o = \cos a\Phi_o$ The processing system exploits the interference signal returning from the interferometer. This signal periodically takes four values x1, x2, x3, x4 corresponding to the modulation levels $\delta\Phi_1$, $\delta\Phi_2$, $\delta\Phi_3$ and $\delta\Phi_4$ respectively.

The result of the operation $(x1+x3)-(x2+x4)$ gives a signal Xg which is indicative of the gain in the modulation control channel. In particular Xg=0 when the condition $\cos\Phi_o = \cos(a\Phi_o)$ is satisfied. This signal Xg serves as error signal for a loop for servocontrol of the gain in the modulation control channel.

Preferably the operation $(x1+x4)-(x2+x3)$ leads to a signal Xp dependant upon the non-reciprocal phase shift $\delta\Phi_p$ to be measured in the interferometer. The signal Xp may then serve as error signal in order to drive the overall phase shift of the interferometer to zero by compensating the non-reciprocal phase $\delta\Phi_p$ with an opposite phase shift $\delta\Phi_{cr}$. This phase shift $\delta\Phi_{cr}$ being generated through the same control channel as the modulation $\delta\Phi_m$, the servocontrol of this channel with the signal Xg therefore makes it possible to obtain a stable and controlled measurement of $\delta\Phi_{cr}$, and therefore finally of $\delta\Phi_p$ which is opposite to it and which is the parameter which it is sought to measure. Xg is therefore independent of the phase shift $\delta\Phi_p$ whilst it is indicative of the gain in the modulation control channel.

These electronic means are digital and comprise an analog-digital converter intended to digitise the signal generated by the detector, a digital processing system exploiting the signal delivered by the analog-digital converter, a digital servocontrol loop filter fed by the signal leaving the digital processing system and delivering a signal representing the measured parameter, a register receiving the signal leaving the digital servocontrol loop filter and delivering a signal depending on the measured parameter for any desired external use, a modulation generator producing a modulation signal, an adder comprising two inputs and one output, its first input being fed by the signal depending on the measured parameter produced by the register, its second input being fed by the modulation signal, and a digital-analog converter fed by the output signal from the adder and controlling the phase modulator.

The invention will be described in detail with reference to the drawings in which.

Figure 1:
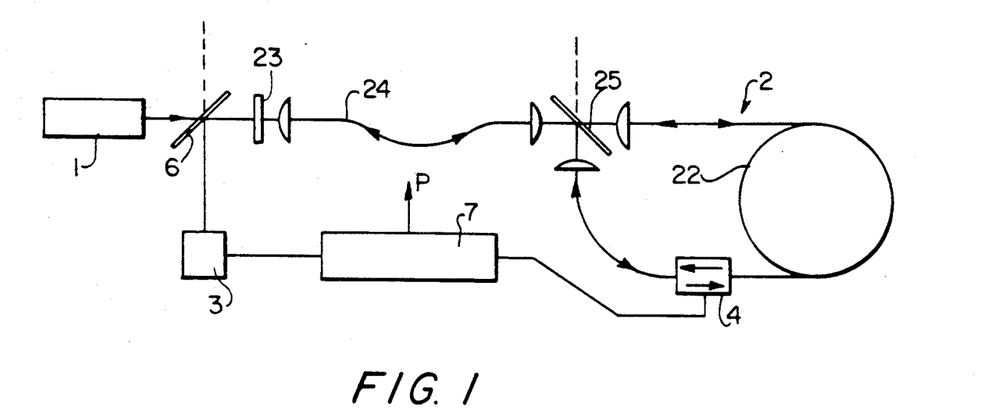
FIG. 1 is a general representation of the measuring device of the invention.

The fibre optic measuring device of the invention comprises a quasi-monochromatic light source 1 which is most often a laser or a super-luminescent diode, and a monomode fibre optic SAGNAC ring interferometer, denoted as a whole by the reference 2.

This ring interferometer 2 comprises a beam splitter 25 ensuring the splitting of the waves at the input of the interferometer then their recombination at the output, and a closed optical path 22 made up by a monomode optical fibre wound up around itself.

This measuring device also comprises a detector 3 delivering a signal depending on the state of interference of the waves at the output of the interferometer itself.

The optical signal is delivered to the detector 3 by way of a splitter 6 for example consisting of a semi-transparent plate.

A modulator 4 which, controlled from an electrical signal, is able to introduce a phase difference between the two waves, is placed at one end of the optical path of the interferometer. The functioning of the interferometer is improved by interposing a polariser 23 and a spatial filter 24 between the light source 1 and the input of the ring 22, that is to say in the vicinity of the beam splitter 25. In a known manner, this spatial filter is made up by a monomode optical fibre.

Electronic means 7 control the phase modulator 4 in negative feedback mode as a function of the signal received from the detector 3.

These electronic means 7 are configured in such a way that the change in the demodulated error signal as a function of the difference in step produced between the two waves in the neighbourhood of zero is approximately linear. This arrangement makes it possible to obtain very good sensitivity on the part of the change in the demodulated error signal in the neighbourhood of zero of the difference in step, whilst it is readily understandable that when the dependence of the signal on the difference in step is of cosine form, the sensitivity in the neighbourhood of zero of the difference in step is very low.

In addition, these electronic means 7 comprise means 19 the function of which is to stabilise the gain in the channel for controlling the modulator. That is to say, this gain is driven so that, for a parameter requiring to be calibrated, the discriminating modulation $\delta\Phi_m$ has four states $\Phi_o$, $a\Phi_o$, $-\Phi_o$ and $-a\Phi_o$ which satisfy $\cos\Phi_o = \cos -101_o = \cos a\Phi_o = \cos -a\Phi_o$.

Further, the function of these electronic means 7 is to keep the difference of step at zero. That is to say, when the change in the measured parameter introduces a phase shift between the two waves in the interferometer, this phase shift produces a change in the signal emitted by the detector 3 causing by way of the electronic means 7 and of the phase modulator 4 an equal response of opposite sense to the phase shift initially produced, so that the global phase shift is reduced to the zero value. With the first loop driving the gain of the channel for controlling the modulation, the measurement of the negative feedback phase shift is then very precise.

Finally, these electronic means 7 deliver a signal depending on the change in the measured parameter by exploiting the signal for controlling the phase modulator 4.

Figure 2:
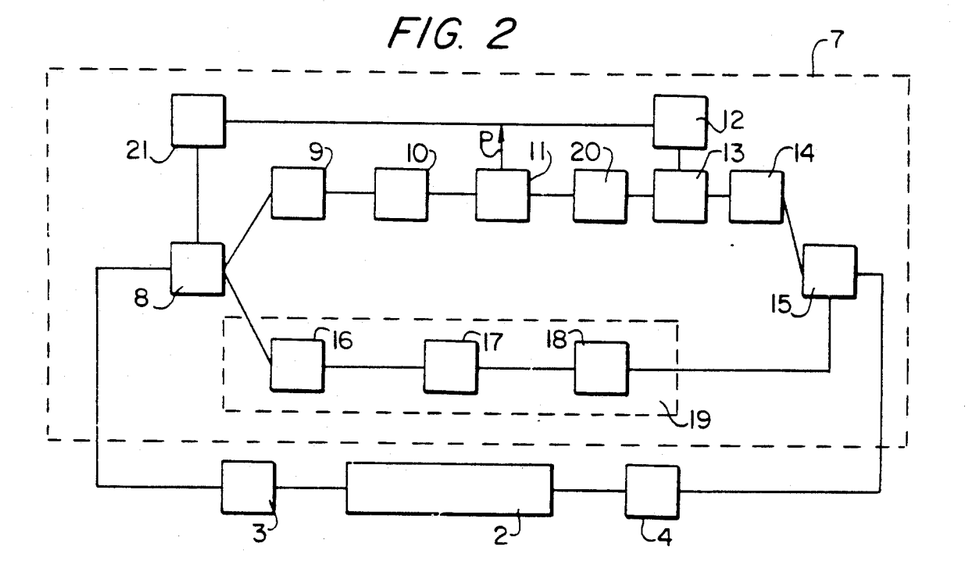
FIG. 2 is a functional diagram representing the processing of the signal.

The electronic means 7 comprise an analog-digital converter 8 intended to digitise the signal emitted by the detector 3.

The range of the analog-digital converter 8 may be relatively small in relation to the range of measurement of the whole. This range is specified from the definition of the low limit and of the high limit.

The low limit is specified in such a way that the analog value corresponding to the least significant bit has a value less than or equal to the standard deviation of the noise of the signal coming from the detector. This condition avoids a blind zone corresponding to the least significant bit, and renders the sampling noise negligible in relation to the initial noise of the analog signal, and in addition, a further digital filtering leads in this case to the same improvement in the signal-to-noise ratio as in analog mode. According to a practical example, the sampling period is of the order of the transit time in the coil namely for example $\tau = 0.5$ $\mu$s for 100 meters of fibre. The Shannon criterion therefore imposes a large pass band on the signal to be sampled: this pass band must be equal to $\frac{1}{2}\tau$, namely 1 MHz in this example. In such a pass band, the noise is relatively large: typically a standard deviation of $10^{-3}$ of the bias return power, which corresponds to a phase shift of about $10^{-3}$ radians in the interferometer. It is therefore sufficient that the least significant bit corresponds to this phase shift in order that sensitivity not be lost and in order to then be able through digital filtering to improve the signal-to-noise ratio.

For its parts, the high limit must at least be greater than the peak to peak value of the noise, namely about 8 times its standard deviation and therefore 3 bits would suffice for the sampling of the noise alone. However, account must also be taken of the inherent range of the signal: in closed loop mode the latter is driven to zero and would not therefore demand any range a priori, but in practice the servocontrol moves away from zero at the time of sudden changes in the parameter to be measured and the range of the converter must be able to cope with these movements. These changes therefore define the number of bits required. In practice, 8 to 12 bits suffice at the converter, whereas after digital filtering the range of the measured parameter may be greater than 20 bits.

The clock 21 drives all of the components.

A digital processing system 9 exploits the signal delivered by the analog-digital converter 8. It is followed by a digital servocontrol loop filter 10 fed by the signal leaving the digital processing system and delivering a signal representing the measured parameter.

A register 11 receives the signal leaving the digital servocontrol loop filter and delivers a signal depending on the measured parameter and which can be used for any desired external use.

A modulation generator 12 produces a modulation signal. The adder 13 comprises two inputs and one output. Its first input is fed by a signal depending on the measured parameter produced by the register 11, its second input is fed by the modulation signal produced by the generator 12.

A digital-analog converter 14 fed by the output signal from the adder 13 controls the phase modulator 4 by way of the gain amplifier 15. The modulation signal produced by the generator 12 ensures the functioning of the system for setting the bias, that is to say an approximately linear dependence between the phase shift introduced between the two counter-propagating waves circulating in the interferometer and the signal produced in the detector 3. To this end the modulation signal $\Phi_m$ is specified in such a way that the modulation of the phase difference $\delta\Phi_m$ which it produces between the counter-propagating waves periodically takes the following four values:

$$\delta\Phi_1 = \Phi_o \quad \delta\Phi_2 = a\Phi_o$$
$$\delta\Phi_3 = -\Phi_o \quad \delta\Phi_4 = -a\Phi_o$$

where $\Phi_o$ is a constant phase shift and it depends on a, and a is a positive constant satisfying the condition:
cos $\Phi_o$ = cos $a\Phi_o$ The processing system exploits the interference signal returning from the interferometer. This signal periodically takes four values x1, x2, x3, x4 corresponding to the modulation levels $\delta\Phi_1$, $\delta\Phi_2$, $\delta\Phi_3$ and $\delta\Phi_4$ respectively.

On the one hand, electronic means 16 perform the operation $(x1+x3)-(x2+x4)$ so as to produce a signal Xg which is independent of the phase shift $\delta\Phi_p$ but is however indicative of the gain of the modulation control channel. In particular, Xg=0 when when the condition cos $\Phi_o$=cos ($a\Phi_o$) is satisfied. This signal Xg may therefore serve as error signal for a loop for servocontrol of the gain of the modulation control channel.

The signal Xp may then serve as error signal for driving the overall phase shift of the interferometer to zero, by compensating the non-reciprocal phase shift $\delta\Phi_p$ with an opposite phase shift $\delta\Phi_{cr}$. This phase shift $\delta\Phi_{cr}$ being generated through the same control channel as the modulation $\delta\Phi_m$, the driving of this channel with the signal Xg therefore makes it possible to obtain a stable and controlled measurement of $\delta\Phi_{cr}$, and therefore finally of $\delta\Phi_p$ which is opposite to it and which is the parameter which it is sought to measure. The electronic means 9 perform the operation $(x1+x4)-(x2+x3)$ in order to produce a signal Xp dependent on the non-reciprocal phase shift $\delta\Phi_p$ to be measured in the interferometer.

Figures 3A, 3B:
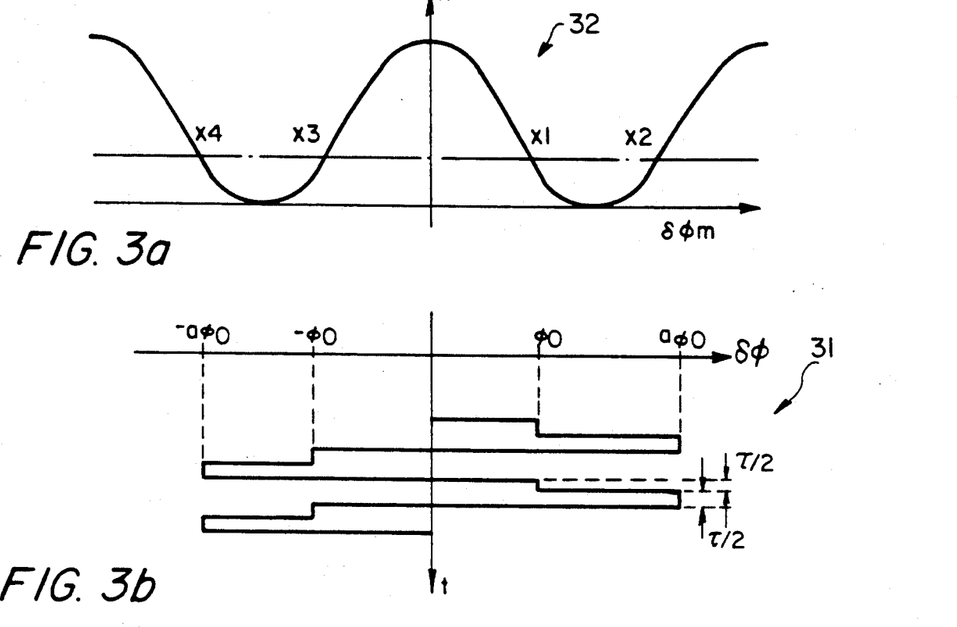
FIGS. 3a–d represent the phase difference in the interferometer and the corresponding signal produced by the detector in the absence of any change in the measured parameter for the modulation signal.
Figure 3C:
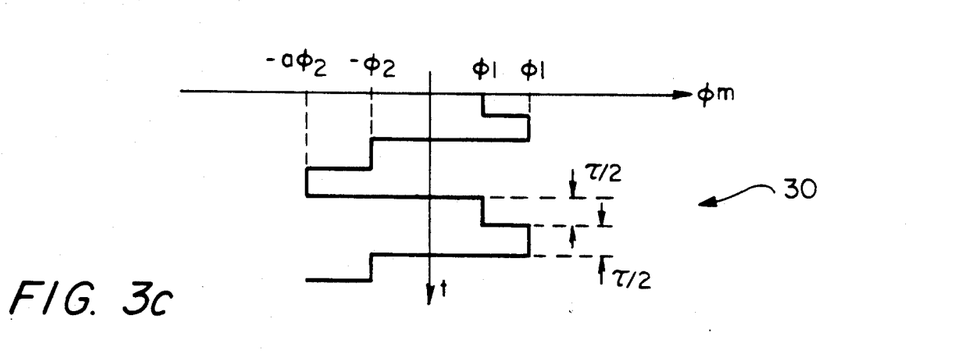
Figure 3D:
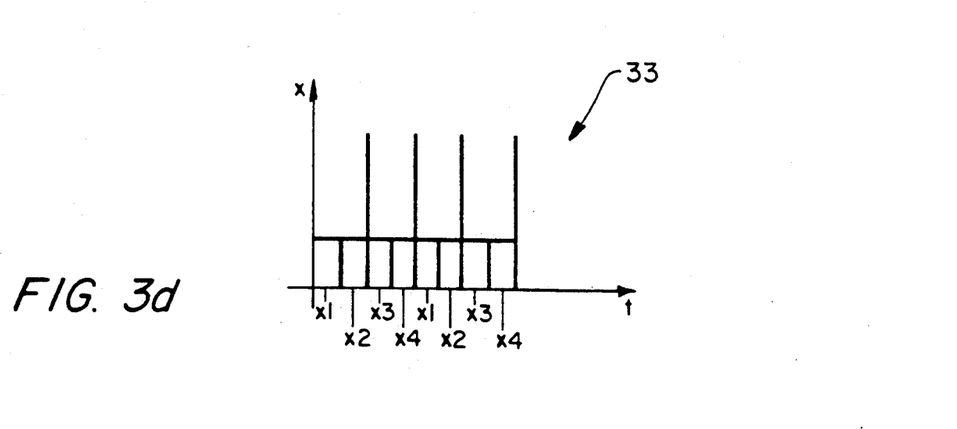

FIG. 3 represents a preferred embodiment of the modulation signal, the phase difference thus generated between the counter-propagating waves of the interferometer and the corresponding signal delivered by the detector 3. The notation used in all the figures corresponds to that already indicated. In addition, —t— represents time.

In the preferred embodiment, represented in FIG. 3, the modulation signal $\Phi_m$ for the phase shift has a period equal to $2\tau$. Each period is made up of a pulse of duration $\tau/2$ and of amplitude $\Phi_1$ and of pulses of the same respective amplitude and duration $a\Phi_1$, $-\Phi_2$, and $-a\Phi_2$. This modulation signal $\Phi_m$ therefore produces a modulation $\delta\Phi_m$ of the phase difference between the two counter-propagating waves. $\delta\Phi_m$ also has a period $2\tau$ and successively takes the values $\Phi_o$, $a\Phi_o$, $-\Phi_o$ and $-a\Phi_o$, with $\Phi_o = \Phi_1 + \Phi_2$, over four periods of time $\tau/2$, $\Phi_o$ and $a\Phi_o$ are specified in such a way that they produce a response of the interferometer of the same level, the derivative of this level as a function of the amplitude of the modulation signal for each of these pulses being positive and negative respectively. This condition is satisfied when $\cos \Phi_o = \cos a\Phi_o$. An approximately linear dependence of the signal delivered by the detector 3 is kept as a function of the phase shift between the counter-propagating waves introduced by the measured parameter by choosing $\Phi_o$ in the region of $\pi/2$, for example between $\pi/3$ and $2\pi/3$. For example, if $a=2$, $\Phi_o = 2\pi/3$, if $a=3$, $\Phi_o = \pi/2$, if $a=4$, $\Phi_o = 2\pi/5$, etc.

The modulation signal 30 introduces by way of the phase modulator 4 a phase shift $\Phi_m$ in the counter-propagating waves. Because of the delay in the coil 2, this phase shift $\Phi_m$ introduces a phase difference $\delta\Phi_m$ represented at 31 which is made up of the difference between the modulation signal and this same signal delayed by $\tau$. The response of the interferometer, consisting of the signal delivered by the detector 3 as a function of the phase difference $\delta\Phi$ between the counter-propagating waves, is represented at 32. The signal delivered by the detector 3 in response to the phase difference represented at 31 is therefore as represented at 33. The values of the signal x1, x2, x3, x4 correspond to the phase differences $\delta\Phi_1$, $\delta\Phi_2$, $\delta\Phi_3$, $\delta\Phi_4$ respectively, set up between the counter-propagating waves.

Figure 4A:
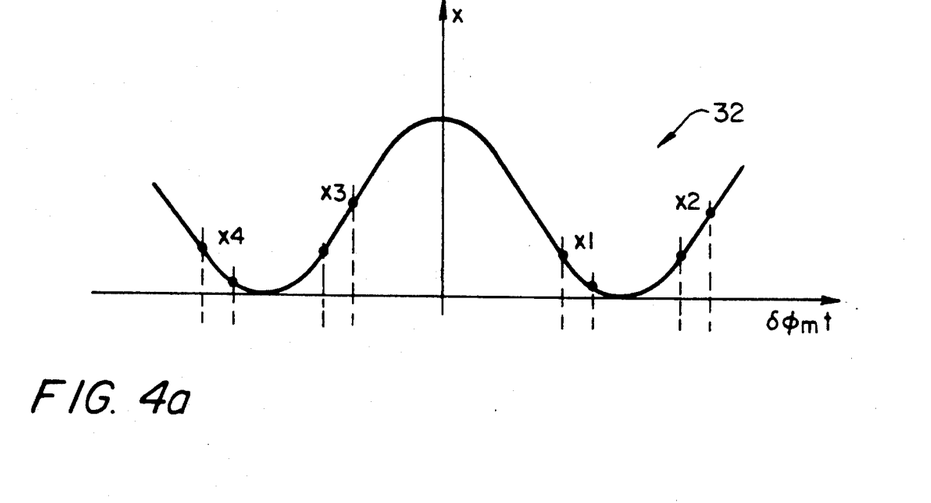
FIGS. 4a–c represent the phase difference in the interferometer and the corresponding signal produced by the detector at the time of a change in the parameter measured with the modulation signal.
Figure 4B:
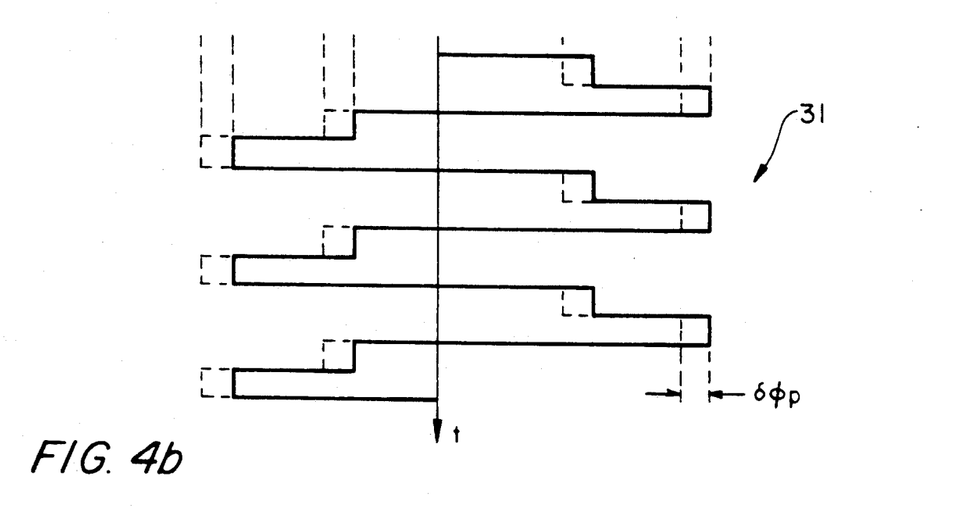
Figure 4C:
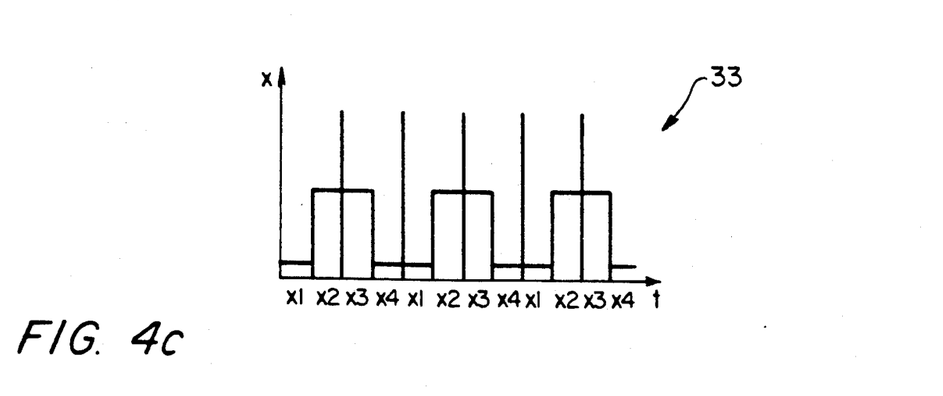

The change in the parameter engenders the addition of a phase difference, assumed to be constant, $\delta\Phi_p$, to the modulation signal. Its effect is represented in FIG. 4: $\delta\Phi_p$ engenders a change in the same sense for x1 and x4 on the one hand, and for x2 and x3 on the other hand, each of these changes being of opposite signs. Thus, the digital processing system 9 produces a signal depending on the measured parameter by exploiting the four respective signals delivered in response to a period of the modulation signal according to the expression $(x1 + x4) - (x2 + x3)$.

This preferred embodiment is particular advantageous since these signals producing changes in the same sense, x1 and x4 on the one hand, x2 and x3 on the other hand, are successive. The operation $(x1 + x4) - (x2 + x3)$ is in fact a demodulation at the modulation frequency $\frac{1}{2}\tau$ of $\delta\Phi_m$. This frequency $\frac{1}{2}\tau$ is known by the name of characteristic frequency, and it is known that by working at this frequency, the effect of the various defects of the modulator on the bias is eliminated. This preferred embodiment therefore conserves this very general property of the characteristic frequency, whilst making it possible to control the gain of the modulation channel.

Figure 5A:
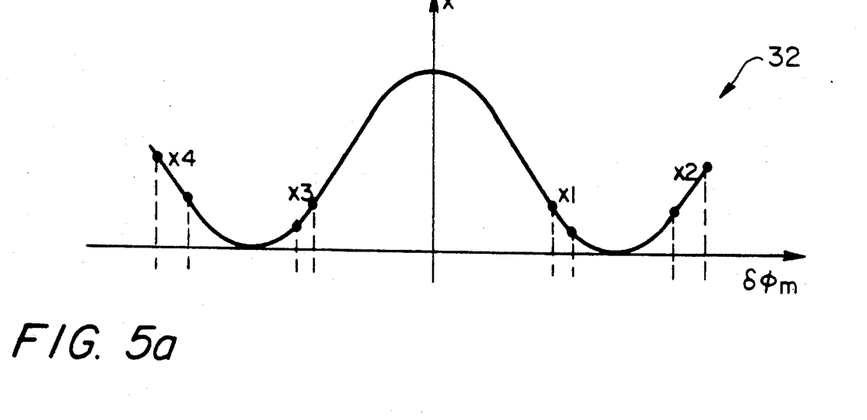
FIGS. 5a–c represent the phase difference in the interferometer and the signal produced by the detector at the time of a change in the gain of the channel for controlling the modulation, with the modulation signal.
Figure 5B:
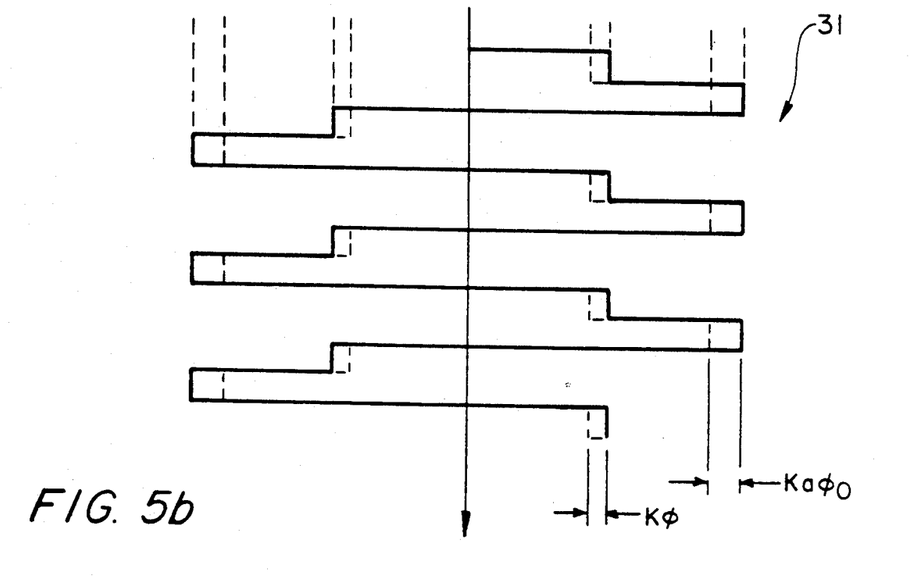
Figure 5C:
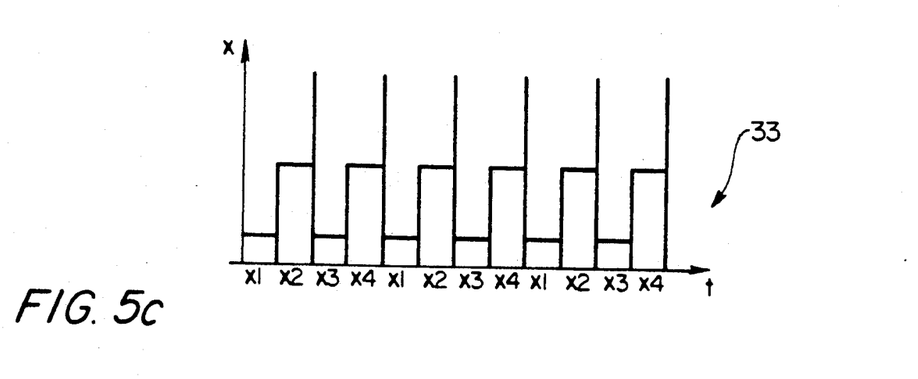

In addition, such a modulation signal makes it possible to keep constant the gain of the channel for controlling the modulation, with simple means 19. The effect of a change by a factor $(1+K)$ in the gain of the channel for controlling the modulation has been represented in FIG. 5. In practice, this change may be engendered through an alteration in the environment and therefore in the operating conditions of the phase modulator 4 or of the gain amplifier 15 on of the analog voltage of the reference of the convecter 14. The phase difference $\delta\Phi_m$ introduced between the counter-propagating waves of the interferometer then suffer a homothetic change for example of value $(1+K)$. This homothetic change produces changes of the same sense, on the one hand of x1 and x3, and on the other hand of x2 and x4, each of these groups changing in the opposite sense. A processing unit 16 exploits the four successive signals in such a way as to deliver a signal according to the expression $(x1 + x3) - (x2 + x4)$ which depends on the gain of the channel for controlling the modulation. This signal is filtered by a digital closed loop integrator filter 17 then feeds a digital-analog converter 18 which controls the gain of the gain amplifier 15 on of the analog voltage of the reference of the convecter 14. Thus, the gain of the channel for controlling the modulation is kept constant between the digital value of the signal and the phase modulation effectively applied to. The signals controlling the phase modulator as a function of the signal received by the detector on the one hand, and those intended for keeping constant the gain of the channel for controlling the modulation on the other hand, are multiplied together.

Figure 6A:
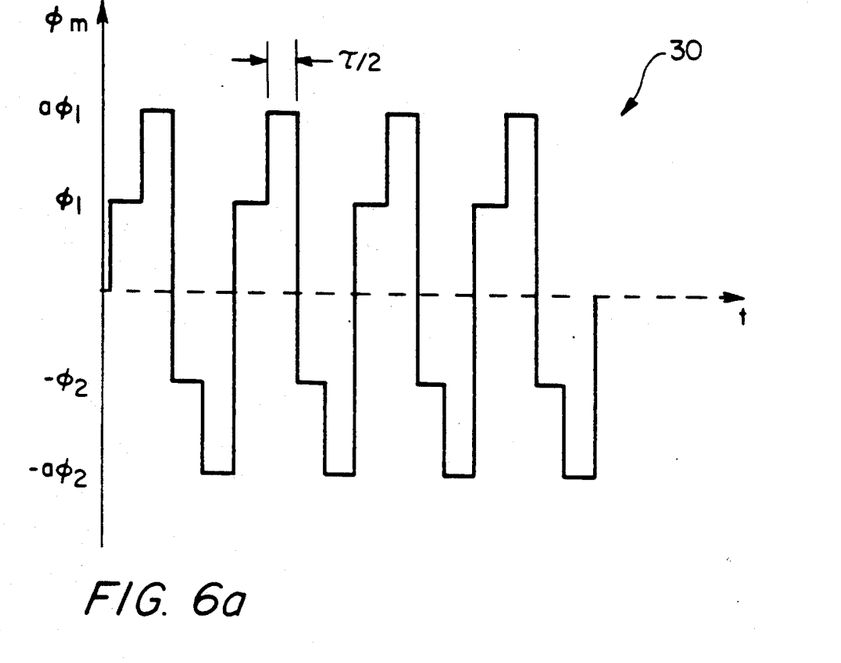
FIGS. 6a–b represent the phase modulation $\Phi_m$ and the negative feedback phase $\Phi_{cr}$.
Figure 6B:
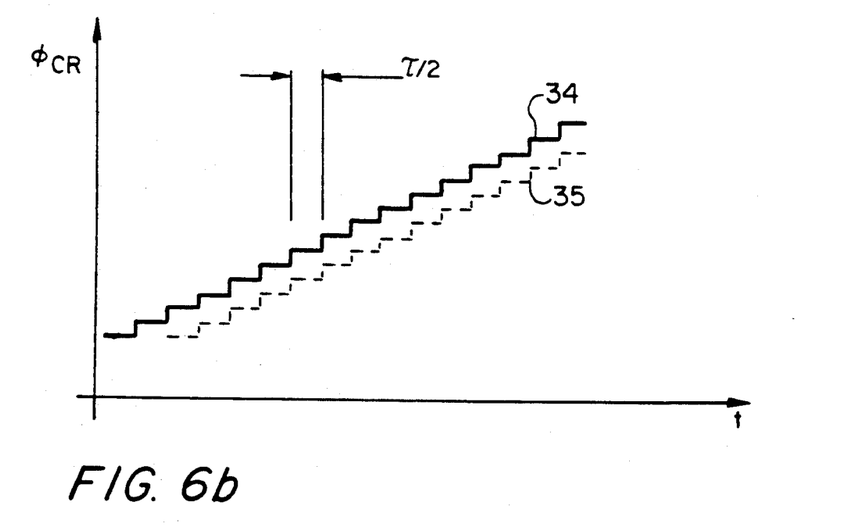

Preferably, the modulation signal has a period equal to $2\tau$, and each period is made up of four elements of duration $\tau/2$ and of amplitude $\Phi_1$, $a\Phi_1$, $-\Phi_2$, $-a\Phi_2$ respectively, with $\Phi_1 + \Phi_2 = \Phi_o$ and in particular $\Phi_1 = \Phi_2 = \Phi_o/2$ or $\Phi_1 = \Phi_o$ and $\Phi_2 = o$. The negative feedback signal is obtained by an accumulator 20 from the digital register 11 for storing the value of the measured parameter, this accumulator 20 consisting of a digital integrator which, in each interval of time $\tau/2$, adds the value of the digital register to its previous value. One of the waves, the one that sees the modulator at the output, is directly submitted to the feedback phase difference 34. The other, the one that sees the modulator at the input is submitted to the same feedback phase difference but changed of the propagation time $\tau$ 35.

The measuring device of the invention is particularly well suited to the construction of a gyrometer. In this case, the measured parameter is the speed of rotation of the interferometer about its axis.

This gyrometer advantageously comes into the construction of navigational control or inertial stabilisation systems.

Such an arrangement is also well suited to the construction of a device for measuring magnetic fields and electric current, by profiting from the Faraday effect.

I claim:

1. A fiber optic measuring device in which the change in a measured parameter generates a phase difference between two waves, the measuring device comprising:
   a) a quasi-monochromatic light source;
   b) a preferably monomide SAGNAC ring interferometer in which two counter-propagating waves propagate, wherein a time for propagation of the waves between their separation and their recombination is $\tau$;
   c) a detector, the detector receiving luminous flux leaving the interferometer and converting it into an electrical signal representing the phase difference between the counter-propagating waves;
   d) a phase modulator; and
   e) electronic means, the electronic means including:
      1) an analog-digital converter digitizing the electrical signal received from the detector;
      2) a processing system delivering signal depending on the measured parameter; and
      3) second electronic means controlling the phase modulator, wherein the second electronic means produces a signal $\Phi_m$ for the modulator such that the phase difference $\delta\Phi_m$ which it produces between the counter-propagating waves periodically takes the successive values:

$$\delta\Phi_1 = \Phi_o \quad \delta\Phi_2 = a\Phi_o$$
$$\delta\Phi_3 = -\Phi_o \quad \delta\Phi_4 = -a\Phi_o$$

wherein $\phi_o$ is a constant phase shift depending on a, and a is a positive constant satisfying the condition cos $\Phi_o$=cos a $\Phi_o$; and 4) a second processing system, the second processing system keeping constant the gain of the channel for controlling the modulation producing a signal depending on the gain by exploiting four values x1, x2, x3, x4 delivered in response to a period of the modulation signal according to the expression (x1+x3)−(x2+x4), the signal acting on the modulation channel so as to keep the gain constant.

2. The fiber optic measuring device of claim 1, wherein:

the processing system includes means to produce a signal depending on the measured parameter by exploiting the four values x1, x2, x3, x4 delivered in response to a period of the modulation signal according to the expression (x1+x4)−(x2+x3).

3. The fiber optic measuring device of the claim 1, wherein:

the electronic means controls the phase modulator in negative feedback mode as a function of the signal received from the detector so that (a) the change in the error signal demodulated as a function of the phase difference in the neighborhood of zero is approximately linear, and (b) this phase difference is kept at zero, and delivers a signal depending on the change in the measured parameter by exploiting the modulation signal.

4. The fiber optic measuring device of claim 1, wherein:

a) the analog value of the least significant bit of the analog-digital converter has a value less than or equal to the standard deviation of the noise of the signal coming from the detector; and b) the electronic means further includes:
1) a synchronizing clock;
2) a digital servo control loop filter fed by the signal leaving the processing system, delivering a signal representing the measured parameter;
3) a register receiving the signal leaving the digital servo control loop filter, the register delivering a signal depending on the measured parameter for any desired external use;
4) an accumulator fed by the signal leaving the register, the accumulator generating a negative feedback signal from the measured parameter;
5) a modulation generator producing a modulation signal $\Phi_m$;
6) an adder including first and second inputs and one output, the first input being fed by the signal depending on the measured parameter produced by the register, the second input being fed by the modulation signal;
7) a gain amplifier; and
8) a digital-to-analog converter fed by the output signal from the adder, the digital-to-analog converter controlling the phase modulator by way of the gain amplifier.

5. The fiber optic measuring device of claim 4, wherein:

the second processing system for keeping constant the gain of the channel for controlling the modulation includes:
1) a unit exploiting four successive signals x1, x2, x3, x4, and delivering a signal depending on (x1+x3)−(x2+x4);
2) a digital closed loop integrator filter, filtering the signal emitted by the unit; and
3) a digital-to-analog converter, converting the signal delivered by the filter, and controlling the gain amplifier.

6. The fiber optic measuring device of claim 1, wherein:

the modulation signal has a period $2\tau$; and
each period consists of two successive elements of duration $\tau/2$, of amplitudes $\Phi_1$ and $a\Phi_1$ respectively, followed by two successive elements of duration $\tau/2$ and of amplitude $-\Phi_2$ and $-a\Phi_2$ respectively, wherein $\Phi_1+\Phi_2=\Phi_o$.

7. The fiber optic measuring device of the claim 6, wherein:

an accumulator obtains a negative feedback signal from a digital register for storing the value of the measured parameter, the accumulator including a digital integrator which, in each interval of time $\tau/2$, adds the value of the digital register to its previous value.

8. The fiber optic measuring device of claim 1, wherein a=3.

9. The fiber optic measuring device of claim 1, wherein a=2.

10. A gyrometer conforming to the measuring device of claim 1, wherein the measured parameter is the interferometer's speed of rotation around its axis.

11. A navigation or inertial stabilization control system, comprising at least one gyrometer of claim 10.

12. A current and magnetic field sensor, conforming to the measuring device of claim 1, wherein a change in the phase difference is produced by the measured parameter through the Faraday effect.

* * * * *